United States Patent
Houri

(10) Patent No.: US 10,157,189 B1
(45) Date of Patent: *Dec. 18, 2018

(54) METHOD AND COMPUTER PROGRAM FOR PROVIDING LOCATION DATA TO MOBILE DEVICES

(71) Applicant: Cyril Houri, Miami Beach, FL (US)

(72) Inventor: Cyril Houri, Miami Beach, FL (US)

(73) Assignee: Vortex Intellectual Property Holding LLC, Miami Beach, FL (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/236,223

(22) Filed: Aug. 12, 2016

Related U.S. Application Data

(63) Continuation-in-part of application No. 14/673,186, filed on Mar. 30, 2015, now Pat. No. 9,418,284, and a continuation-in-part of application No. 15/139,631, filed on Apr. 27, 2016, now Pat. No. 9,911,190.

(60) Provisional application No. 61/977,580, filed on Apr. 9, 2014.

(51) Int. Cl.
*G06K 9/00* (2006.01)
*G06F 17/30* (2006.01)
*H04W 4/021* (2018.01)

(52) U.S. Cl.
CPC .. *G06F 17/30241* (2013.01); *G06F 17/30259* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 6,134,448 | A | 10/2000 | Shoji et al. |
| 6,438,491 | B1 | 8/2002 | Farmer |
| 6,799,049 | B1 | 9/2004 | Zellner et al. |
| 7,042,391 | B2 | 5/2006 | Meunier et al. |
| 7,155,238 | B2 | 12/2006 | Katz |
| 7,319,878 | B2 | 1/2008 | Shyenblat et al. |
| 7,433,695 | B2 | 10/2008 | Gordon et al. |
| 7,437,444 | B2 | 10/2008 | Houri |
| 7,466,986 | B2 | 12/2008 | Halcrow et al. |
| 7,475,897 | B2 | 1/2009 | Morgan et al. |
| 7,493,127 | B2 | 2/2009 | Morgan et al. |
| 7,696,923 | B2 | 4/2010 | Houri |
| 8,195,216 | B2 | 6/2012 | Houri |

(Continued)

*Primary Examiner* — Shervin Nakhjavan
(74) *Attorney, Agent, or Firm* — Brian Roffe

(57) ABSTRACT

Method for providing position-based information to a mobile device with at least one imaging device includes obtaining, using the imaging device, an image including a stationary pattern of pixels, searching through a database of pixel patterns for a pixel pattern that most closely matches the pattern of pixels in the obtained at least one image, the database containing pixel patterns and positional information about the pixel patterns, and retrieving from the database as a result of the searching, positional information about one of the pixel patterns that is deemed to most closely match the pattern of pixels in the obtained at least one image. Data is provided to the mobile device, i.e., to a data output device or functionality thereof, dependent on the retrieved positional information about one of the pixel patterns that is deemed to most closely match the pattern of pixels in the obtained at least one image.

20 Claims, 5 Drawing Sheets

(56) References Cited

U.S. PATENT DOCUMENTS

| | | |
|---|---|---|
| 8,239,510 B2 | 8/2012 | Houri |
| 8,565,788 B2 | 10/2013 | Houri |
| 8,670,381 B1 | 3/2014 | Houri |
| 8,807,428 B2 | 8/2014 | Morgan |
| 8,958,601 B2 | 2/2015 | Lin |
| 8,983,773 B2 | 3/2015 | Hamilton, II et al. |
| 9,036,867 B2 | 5/2015 | Chiussi |
| 9,311,523 B1 | 4/2016 | Nam |
| 9,324,003 B2 * | 4/2016 | France .................. G01C 15/00 |
| 2004/0167688 A1 | 8/2004 | Karlsson et al. |
| 2009/0285450 A1 | 11/2009 | Kaiser et al. |
| 2010/0020074 A1 | 1/2010 | Taborowski |
| 2010/0208057 A1 | 8/2010 | Meier et al. |
| 2011/0211760 A1 | 9/2011 | Boncyk et al. |
| 2011/0282578 A1 | 11/2011 | Miksa et al. |
| 2012/0315884 A1 | 12/2012 | Forutanpour et al. |
| 2013/0136300 A1 | 5/2013 | Wagner |
| 2013/0223673 A1 | 8/2013 | Davis |
| 2013/0314442 A1 | 11/2013 | Langlotz et al. |
| 2014/0016821 A1 | 1/2014 | Arth et al. |
| 2014/0022394 A1 | 1/2014 | Bae |
| 2014/0223319 A1 | 8/2014 | Uchida |
| 2014/0297485 A1 | 10/2014 | Steely et al. |
| 2015/0043733 A1 | 2/2015 | Swaminathan |
| 2015/0178565 A1 | 6/2015 | Rivlin et al. |
| 2015/0215383 A1 * | 7/2015 | Sun ..................... G06F 17/3089 |
| | | 709/203 |
| 2015/0243030 A1 | 8/2015 | Pfeiffer |
| 2015/0287246 A1 | 10/2015 | Huston et al. |
| 2016/0063345 A1 | 3/2016 | Nomura et al. |
| 2016/0086372 A1 | 3/2016 | Trull et al. |
| 2017/0344114 A1 * | 11/2017 | Osterhout ............... G06F 3/017 |

* cited by examiner

METHOD AND COMPUTER PROGRAM FOR PROVIDING LOCATION DATA TO MOBILE DEVICES

CROSS-REFERENCE TO RELATED APPLICATIONS

This application is a continuation-in-part of:

U.S. patent application Ser. No. 14/673,186 filed Mar. 30, 2015, which claims priority under 35 U.S.C. § 119 of U.S. provisional patent application Ser. No. 61/977,580 filed Apr. 9, 2014; and U.S. patent application Ser. No. 15/139,631 filed Apr. 27, 2016, all of which are incorporated by reference herein.

FIELD OF THE INVENTION

The present invention also relates generally to a method, system and computer program to provide a location of a mobile device and data relate thereto based on positional information associated with pixel patterns from a database that may be generated by the same mobile device.

The present invention further relates to a method, system and computer program that guides a device or a person holding a mobile device to a sought destination based partly on image analysis. A navigation technique is thus disclosed to guide a person or automated device to a destination.

BACKGROUND OF THE INVENTION

Cellular telephones, smartphones and other portable telecommunications devices often include at least one imaging device to take pictures of objects and other patterns of pixels. Images are taken upon command by the user.

The images can be used for a variety of different purposes. For example, U.S. Pat. No. 8,807,428 (Morgan), entitled navigation of mobile devices, describes a method for navigation of a mobile device including determining spatial information of at least one beacon detected in an image relative to the image, the image being an image of the beacon within at least part of an environment surrounding the mobile device, and determining a position of the mobile device based on the spatial information. This latter step entails encoded visual information of the beacon and at least two indicators of the beacon detectable only in a restricted wavelength image. The two indicators are located on either side of the encoded visual information.

U.S. Pat. No. 8,958,601 (Lin) entitled optical navigation method and device using same, describes an optical navigation method, which includes sequentially obtaining three images, choosing a main reference block in one image, comparing the main reference block and a another image by block matching comparison to determine a first motion vector, resizing the main reference block according to the first motion vector to generate an ancillary reference block having a size smaller than the main reference block, and comparing the ancillary reference block and yet another image by block matching comparison to determine a second motion vector.

U.S. Pat. No. 8,983,773 (Hamilton, I I et al.) entitled pictorial navigation, describes methods, systems and program products for providing pictorial information relevant to a geographic location. In the method, a characteristic relevant to a geographic location is selected, a pictorial image database is searched for images having an embedded tag associated with the characteristic, and in response to this searching, at least one image file is retrieved from the database that has an embedded tag correlated to the geographic location characteristic. A physical appearance or an attribute of the location is visually depicted. Characteristics of the at least one image file are analyzed and preferred image data is selected from the at least one image file and formatted for presentation. The formatted image data is associated with the geographic location, and presented in association with the geographic location. Associated image data may indicate a distance and direction from a geographic location. Routing system applications are enabled to present pictorial information with navigation route points.

U.S. Pat. Appln. Publ. No. 20140022394 (Bae et al.) describes a method for tracking an object including obtaining an image captured by a camera, setting a plurality of patterns having various sizes, according to a distance from a horizon in the image to a plurality of pixels in the image, extracting an object matching one of the plurality of patterns having various sizes, while scanning the image using the plurality of patterns having various sizes, and displaying information about a position of the extracted object in the image.

SUMMARY OF THE INVENTION

A method for providing position-based information to a mobile device with at least one imaging device in accordance with the invention includes obtaining, using the at least one imaging device of the mobile device, at least one image including a stationary pattern of pixels, searching through a database of pixel patterns for a pixel pattern that most closely matches the pattern of pixels in the obtained at least one image, the database containing pixel patterns and positional information about the pixel patterns, retrieving from the database as a result of the searching, positional information about one of the pixel patterns that is deemed to most closely match the pattern of pixels in the obtained at least one image, and providing data to the mobile device, i.e., to a data output device or output functionality thereof, dependent on the retrieved positional information about one of the pixel patterns that is deemed to most closely match the pattern of pixels in the obtained at least one image.

The database of pixel patterns with positional information may be generated in a preceding database generation stage by, for example, obtaining, using the at least one imaging device of the mobile device, at least one image including a pattern of pixels, and processing, using a processor of the mobile device, each of the at least one obtained image based in part on a position of the mobile device when the at least one image was obtained to derive positional information about the pattern of pixels. The database may be resident on the mobile device. The database may be generated by one or more other mobile devices and provides to each mobile device, i.e., a community-sourced database.

Data may be provided to the mobile device dependent on the retrieved positional information in a variety of ways, e.g., displaying on a screen of the mobile device, indications of the position of the mobile device, surrounding structure and/or the position of the pattern of pixels in the obtained at least one image. A map including the position of the mobile device can also be displayed. Data may be provided to the mobile device dependent on the retrieved positional information which is configured to visually convey information on a display of the mobile device and/or audibly convey information via the mobile device.

A navigation method in accordance with the invention includes determining an initial position of a mobile device to be guided as according to the method above, and then guiding movement of the mobile device, after the initial position of the mobile device is determined, by analyzing using the processor, movement of the mobile device relative to the initial position. Guiding movement of the mobile device may entail obtaining multiple images each including a common pattern of pixels and obtained at different times separated by movement of the mobile device and analyzing, using the processor, the multiple images to determine relative movement of the mobile device. Alternatively, guiding movement of the mobile device may entail obtaining multiple images at different times separated by movement of the mobile device and analyzing, using the processor, changes in patterns in the multiple images to determine relative movement of the mobile device. Also, the method may include determining an accurate updated position of the mobile device to be guided, after the movement of the mobile device has been guided by analyzing movement of the mobile device relative to the initial position, and then using this updated position, guiding movement of the mobile device, after the updated position of the mobile device is determined, by analyzing using the processor, movement of the mobile device relative to the updated position.

A computer program embodied on non-transitory computer-readable medium and configured to provide position-based information to a mobile device with at least one imaging device in accordance with the invention operates by directing the at least one imaging device of the mobile device to obtain at least one image including a stationary pattern of pixels, directing a processor to search through a database of pixel patterns for a pixel pattern that most closely matches the pattern of pixels in the obtained at least one image, the database containing pixel patterns and positional information about the pixel patterns, directing the processor to retrieve from the database as a result of the searching, positional information about one of the pixel patterns that is deemed to most closely match the pattern of pixels in the obtained at least one image, obtaining data dependent on the retrieved positional information about one of the pixel patterns that is deemed to most closely match the pattern of pixels in the obtained at least one image, and conveying the obtained data via a data output device of the mobile device. The computer program may also be configured to generate the database of pixel patterns with positional information by directing the at least one imaging device of the mobile device to obtain images each including a pattern of pixels, and directing the processor to process each obtained image based in part on a position of the mobile device when the at least one image was obtained to derive positional information about the pattern of pixels.

BRIEF DESCRIPTION OF THE DRAWINGS

The invention, together with further pattern of pixels and advantages thereof, may best be understood by reference to the following description taken in conjunction with the accompanying drawings, wherein like reference numerals identify like elements, and wherein.

DETAILED DESCRIPTION OF THE INVENTION

Figure 1:
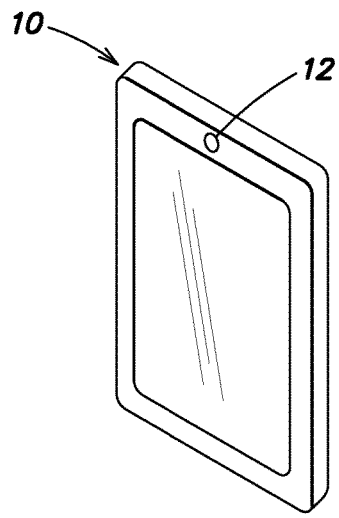
FIG. 1 is a front view of a first embodiment of a mobile device in which the invention may be applied.
Figure 2:
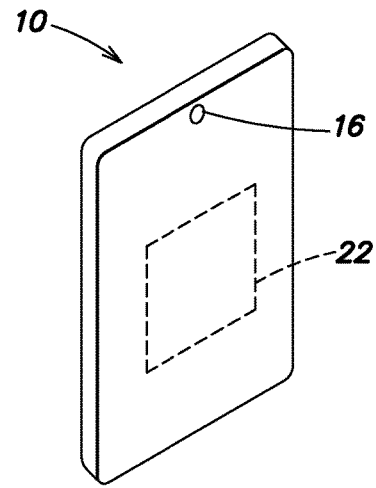
FIG. 2 is a rear view of the first embodiment of a mobile device in which the invention may be applied.
Figure 3:
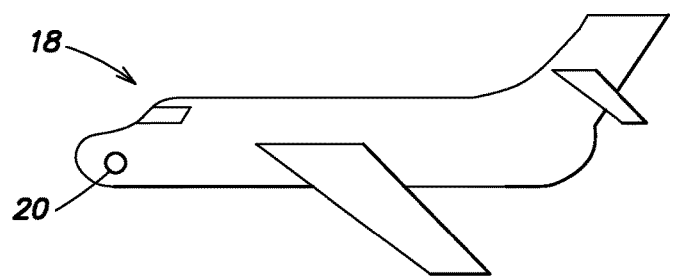
FIG. 3 is a perspective view of a second embodiment of a mobile device in which the invention may be applied.

Referring to the accompanying drawings wherein like reference numbers refer to the same or similar elements, the present invention is designed for use with a mobile device with at least one imaging device or system. As shown in FIG. 1, an example of a mobile device 10 is a portable communications device that includes an imaging device 12 on a front side, i.e., that side on which the screen 14 is location, as well as an imaging device 16 on a rear side (see FIG. 2). Another example of a mobile device in which the invention may be applied is a drone 18 as shown in FIG. 3 that includes an imaging device 20. A "drone" as used herein will generally mean a pilotless flying vehicle. An example of a common drone for use with the invention is a quad-copter type of drone that may fly inside a building but for which there is no precise way to get an accurate position inside the building. The invention is not limited to the illustrated mobile device 10, i.e., a communications device and a drone 18, and encompasses all mobile devices that include an imaging device such as a camera. Examples include laptop computers, tablets, notepads, and the like.

Figure 4:
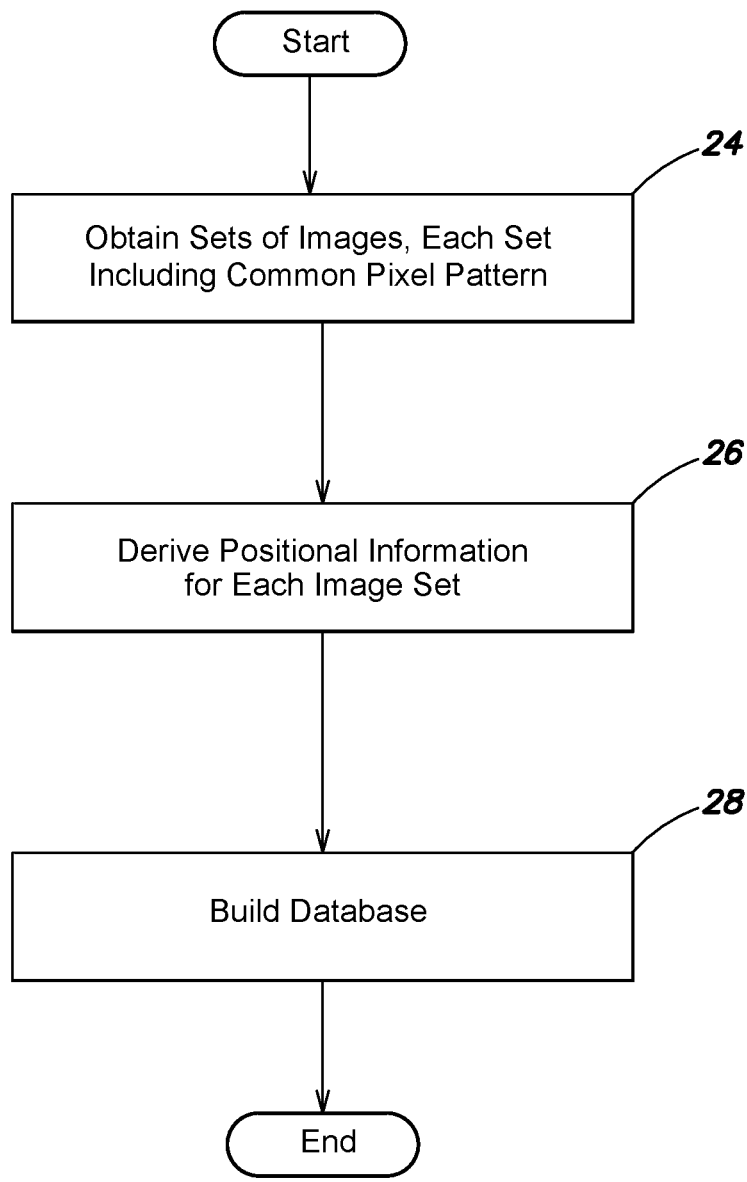
FIG. 4 is a flow chart of a method for generating a database of positional information for pixel patterns in accordance with the invention.

FIG. 4 is a flow chart of a method for generating a database of pixel patterns with positional information using a mobile device with at least one imaging device. More specifically, the database can be said to include positional relationships between a size and/or angular orientation of numerous pixel patterns and associated determined positions of the mobile device when images including the pixel patterns having that size and/or angular orientation were obtained, which positional relationships are used to provide an estimation of, during operative use of the database, the position of a mobile device that images one of the pixel patterns for which positional relationships are stored in the database.

This database generation is provided as an example of the manner in which a database 22 of pixel patterns and positional information or relationships is generated or obtained, for later use by the mobile device 10 in providing positional information based on pixel pattern analysis or providing positional data or information that is selectively presented based on input positional data. The combination of information about pixel pattern appearance (size and/or angular orientation) and position data of a mobile device when an image including the pixel pattern is obtained may be referred to as a positional relationship. Other ways to generate the database 22 are also envisioned as being within the scope and spirit of the invention. For the purposes of this application, database 22 may represent a single database or a plurality of physically separate databases.

Each positional relationship may include coordinates of the position of an imaging device when an image taken by the imaging device includes a pixel pattern having a quantifiable size and/or angular orientation. The positional relationships are referenced when an image is obtained by a mobile device with the same general appearance, or more particularly size, as the pixel pattern in an image used to generate the database. That is, if an image includes a pixel pattern that has the same appearance, e.g., size and/or angular orientation, as one of the pixel patterns used to generate the database 22, then this would mean that the imaging device taking the image is situated in the same position as an imaging device was earlier situated when the pixel pattern was processed to generate a positional relationship for inclusion in the database 22. This positional relationship may include longitude and latitude coordinates, or any other coordinate system that is two or three-dimensional and covers a surface area of interest. Thus, the positional relationship provides the position of an imaging system when obtaining an image including the pattern of pixels and information about the appearance of the pattern of pixels relative to that position. Using the appearance of a pixel pattern, e.g., its size and/or angular orientation, and referring to the positional relationships between pixel pattern appearance and mobile device position, position of a mobile device is determinable, or at least an estimate thereof can be calculated by a processor receiving data about the positional relationship.

Accordingly, the positional relationship between a size of the pattern of pixels and an associated determined position of the mobile device when the at least one image including the pattern of pixels was obtained enables determination of an estimation of the position of the mobile device upon input of another image including the same pattern of pixels. As mentioned above, if the new image has the same pattern of pixels with the same size and angular orientation, then the positional relationships from the database are used to output information that the mobile device is in the position associated with that pattern of pixels with that size and angular orientation. This differs from geotagging since there is typically no consideration or measure of the size and/or angular orientation of an object when geotagging.

Typically, for processing purposes, the pixel pattern will be assigned a digital signature, with the digital signature of multiple images being compared to determine which contain a common digital signature indicative of the same pixel pattern. Pixel patterns with common digital signatures are grouped together since they will be considered to represent the same object providing the pattern of pixels.

As a first step 24, a set of images is obtained using the imaging device of the mobile device. This set may include only one image. Alternatively, the set may include a plurality of images taken from different positions of the mobile device relative to a common, stationary pattern of pixels. In the latter case, the set includes the common, stationary pattern of pixels in each image.

Obtaining the images when the set includes multiple images may involve positioning the mobile device 10 in each of the positions relative to the pattern of pixels at different times and pressing an image obtaining actuator on the mobile device 10 while the mobile device 10 is in each of the different positions. This actuator may be, as is common, a designated area of the screen 14 of the mobile device 10.

As an alternative, a panoramic camera may be attached to the mobile device 10 and actuated to obtain the single image or plurality of images.

These images are processed in a second step 26 to derive positional information about the pixel pattern. This positional information is based on analysis of the position of the mobile device when each image was taken and the appearance of the pixel pattern in each image. Particularly, the pixel pattern is analyzed with respect to its size and/or the angle between the imaging direction and the pixel pattern to derive the positional information.

As an example, when a single image is taken in step 24, the position of the pixel pattern or object in the image is known and the position of the mobile device 10 is known. As such, the angle AT between the imaging direction of the imaging device of the mobile device 10 and the object is known (see FIG. 7). This imaging angle is associated with the pixel pattern, along with the size of the pixel pattern relative to the position of the mobile device 10.

Figure 5:
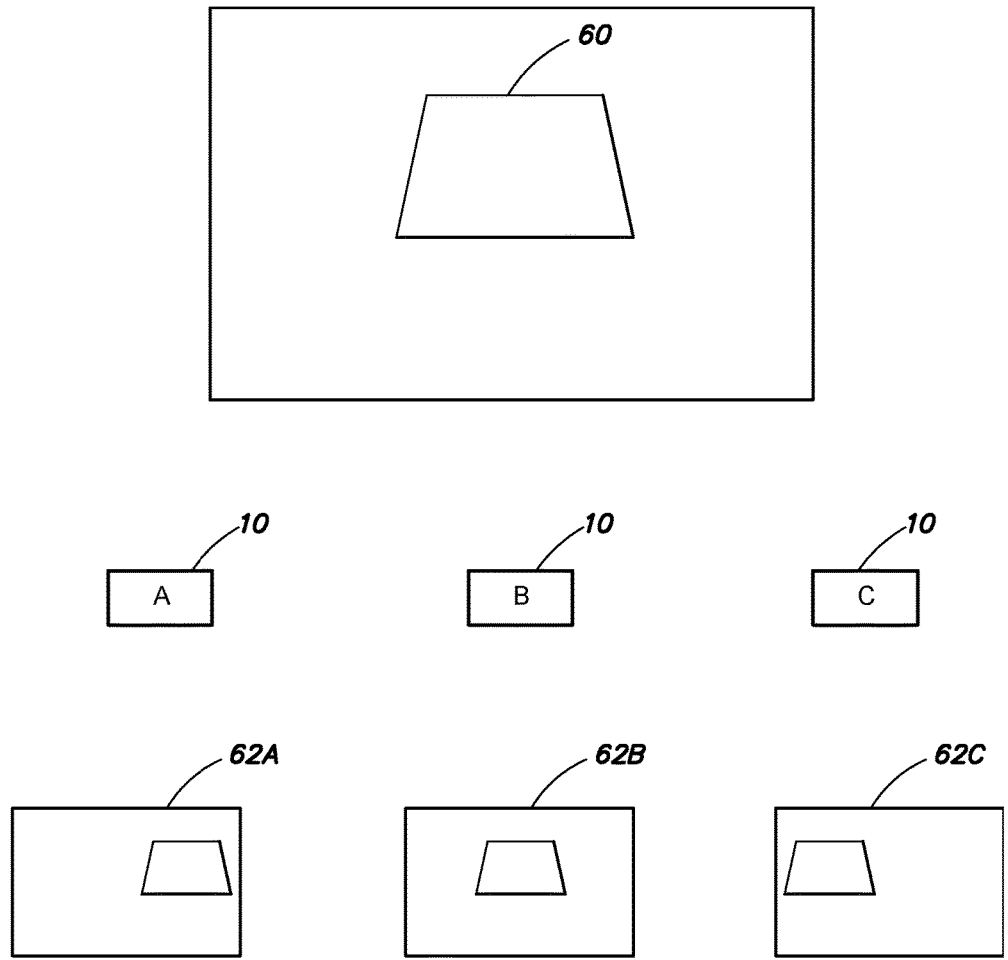
FIG. 5 is a schematic showing the manner in which multiple images including a common, stationary pixel pattern, in this case, a picture on a wall, are obtained.

Referring to FIG. 5, three different positions of the mobile device 10 are shown, A, B and C, although images in any number of different positions including the common pixel pattern, in this case, a picture 60 on a wall, may be obtained. The image 62A obtained of the picture 60 when the mobile device 10 is in position A shows the picture 60 to the right of the image. The image 62B obtained of the picture 60 when the mobile device 10 is in position B shows the picture 60 in the center of the image. The image 62C obtained of the picture 60 when the mobile device 10 is in position C shows the picture 60 to the left of the image. The angular orientation of the picture 60 is therefore different in the three images 62A, 62B and 62C. In a similar manner, by moving the mobile device 10 closer and farther away from the picture, different images may be obtained with different sizes of the picture 60.

A plurality of sets of images is obtained in the same manner, with each set including a common, stationary pixel pattern, usually but not required to be an object. For example, the pixel pattern may be a pattern of buildings or a number on a building. It is also possible for one or more of the sets to have only a single image and positional information derived therefrom. The positional information about the pixel patterns is stored in the database 22 in association with the pixel patterns, in step 28. The database 22 may therefore include a form of a table with pixel patterns in a searchable form and positional information to be output.

Once generated, the database 22 may be shared with other mobile devices in a manner known to those skilled in the art. Similarly, a database generated using another mobile device may be provided to mobile device 10 to increase the number of pixel patterns and associated positional information stored in the database 22.

Figure 6:
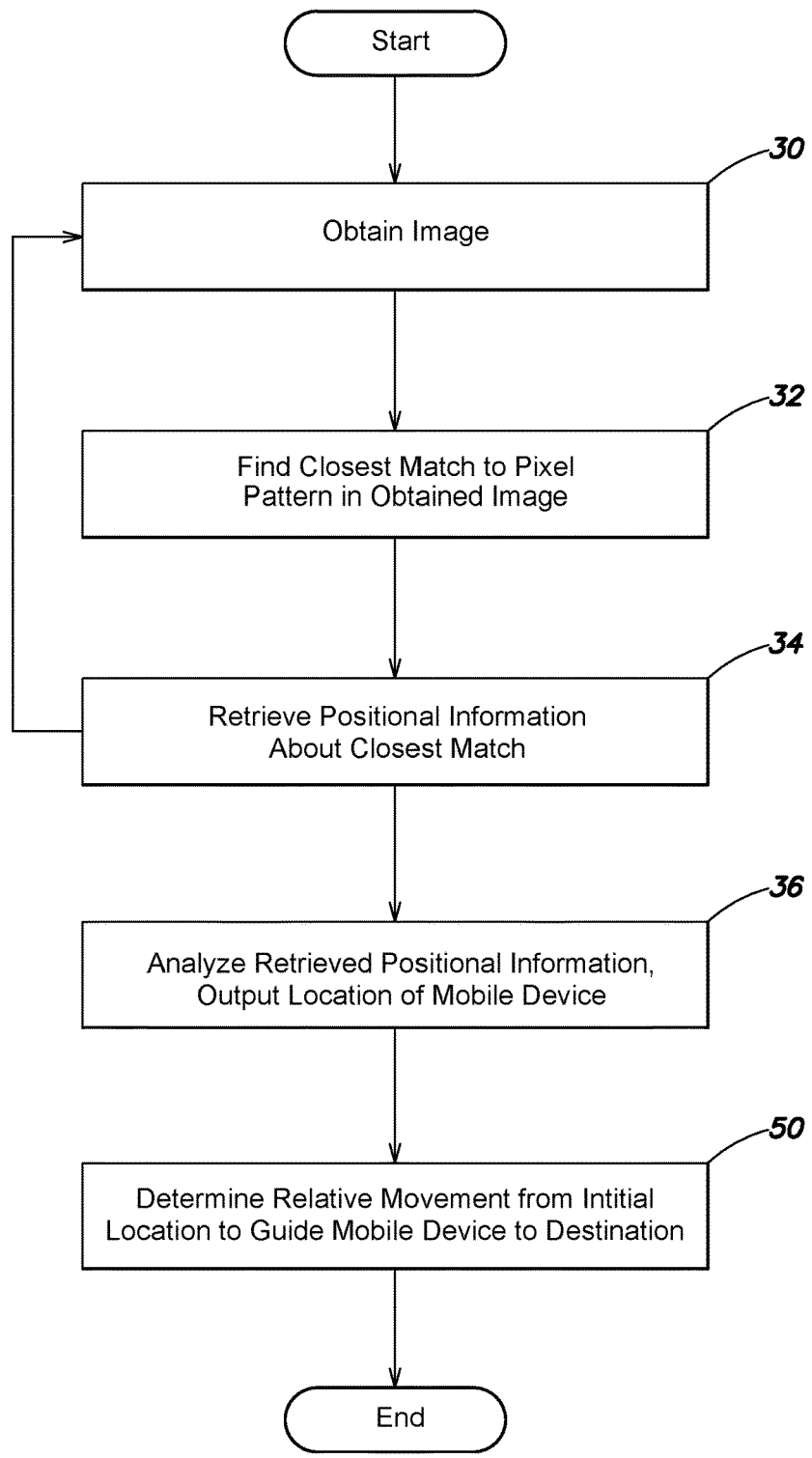
FIG. 6 is a flow chart of a method for using a database of positional information for pixel patterns or objects in accordance with the invention in order to provide a location of a mobile device based on imaging, and a navigation method based on the location provided.

As for use of the database 22, a flow chart of a method for determining location of the mobile device 10 is shown in FIG. 6 and includes obtaining at least one image including a stationary pattern of pixels using the mobile device 10 in step 30. In step 32, a processor of the mobile device 10 searches through the database 22 of pixel patterns for the obtained pattern of pixels, and in step 34, retrieving positional information about one of the pattern of pixels that is deemed to be a closest match to the obtained pattern of pixels. Algorithms to perform this closest match processing are known to those skilled in the art to which this invention pertains.

In step 36, an analysis is performed to obtain, as a result, the location information about the mobile device 10. This analysis is typically analysis of an angle between an imaging direction in which the image was obtained by the mobile device 10 and the imaging direction in which the pattern of pixels in the image containing the closest match pixel pattern, and/or analysis of a size of the pattern of pixels in the image relative to the size of the pixel pattern in the image containing the closest match pixel pattern, both considered in combination with the retrieved positional information.

Figure 7:
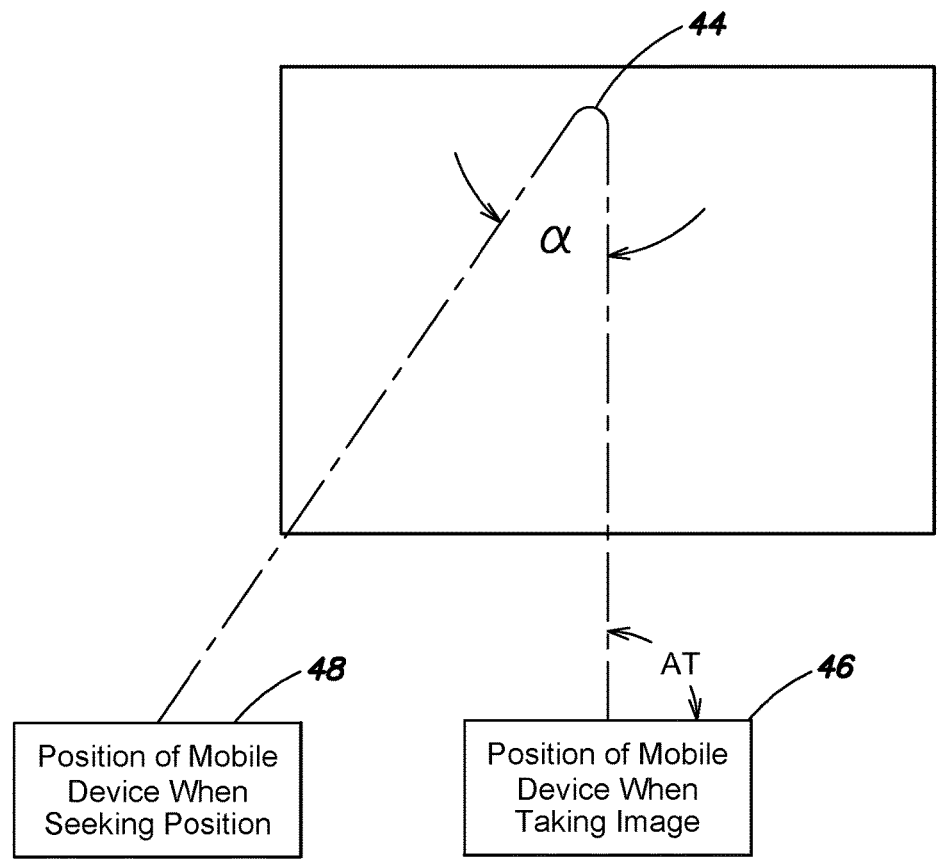
FIG. 7 is a schematic showing use of an angle to determine mobile device location.

As to the angular analysis, it may be known that the image used in the database generation phase was taken from directly in front of the pixel pattern (see position 46 in FIG. 7). During the operational phase, an image is obtained from a position to the left of position 46, i.e., from position 48. As such, image analysis will indicate the angle α between the imaging direction, i.e., the direction in which the imaging device is pointing when taking the picture to obtain location information, and the imaging direction in which the image was taken for preparation for storage in the database. This angle can be, mathematically, applied in combination with the position of the mobile device 10 when the image was taken for preparation for storage in the database (position 46) in order to derive the current location of the mobile device 10 (position 48). That is, position 48 is a function of position 46 and angle α.

As to the size analysis, a similar analysis may be performed. If the size of the pixel pattern in the image taken for preparation for storage in the database when the mobile device 10 was in position 46 is known, and the size of the same pixel pattern in the image taken by the mobile device 10 in its current position 48 is determined by image analysis, then the location of the mobile device 10 when seeking its current position 48 is a function of position 46 and the size differential.

As an example of a use wherein the size alone is used to provide the position of the mobile device 10, if the image currently obtained by the mobile device 10 is determined to include an object, such as a monument, and the size of the monument in the currently obtained image is determined to be half that of the size of the monument in the image from the database, then the processor of the mobile device 10 will output that the mobile device 10 is at a distance about twice that of the distance between the monument and the location of the mobile device 10 when the image was taken. A radius of this distance will be output if only one image is used. By using additional images and/or an angular analysis from one or more images, the output location of the mobile device 10 can be improved. Algorithms to perform this enhanced location output would be readily ascertainable by those skilled in the art to which this invention pertains in view of the disclosure herein.

The positional information to be provided may be that the mobile device 10 is at a specific distance from the pixel pattern representing an object or some other stationary object, or more general, e.g., a village, city, town, street or building where the object is located. The provided information may simply be that the mobile device 10 is situated in front of the object. A map may be displayed on a screen 14 including the location of the mobile device 10 to enable the viewer to view the screen 14 and know their position relative to indicia on the displayed map. The display on the screen 14 may also include the position of the pixel pattern being used to determine the position of the mobile device 10. Additionally, a pointer may be used to indicate the angle between the imaging direction of the imaging device of the mobile device 10 and the pixel pattern. Identification of the pixel pattern may also be provided, if known, and associated with the pixel pattern in the database 22. Any other use of the position of the mobile device 10 determined in the above manner is also contemplated as being within the scope of the invention.

The angular analysis may be performed independent of the size analysis or both in combination. Other characteristics of the images may also be used.

Although it is possible to provide the location of the mobile device 10 using only a single image containing a pixel pattern that is found in the database, preferably multiple images are obtained and used to provide positional information to improve the accuracy of the location determination of the mobile device 10. To this end, the method may involve a loop to obtain and analyze additional images, see the link from step 34 to step 30. Moreover, since it is not guaranteed that a currently obtained image will contain a pixel pattern that can be recognized as being in the database, taking multiple images increases the probability that an object in an image will be recognized.

Recognition of an object as being in the database may involve analysis of the images relative to the pixel patterns or digital signatures thereof and to a matching threshold. Only if the analysis determines that the pixel pattern of the currently obtained image is above the matching threshold, then the positional information about the pixel pattern will be output by the processor.

The methods explained with reference to FIGS. 4 and 6 can be executed by a computer program resident in memory media or a memory component in the mobile device 10 or elsewhere. The computer program would be designed to allow for obtaining images (direct the imager to take images), ensuring that the images contain a common pixel pattern to enable derivation of positional information for storage in the database, management of the database and then subsequent use of the database upon receipt of an image with a pixel pattern. The computer program may be resident in non-transitory computer-readable media The computer program is operable in two different modes. The first mode would be the database generation mode or training phase, explained with reference to FIG. 4. This database generation mode is independent of the second mode, i.e., the database use mode explained with reference to FIG. 6, and vice versa. The database use mode may use the database generated in accordance with the flow chart in FIG. 4 or with any other database however generated that includes pixel patterns or objects for example, and positional information about them. A database of geo-tagged objects may be used. Indeed, it is contemplated that a computer program executing the second mode would operate with a pre-existing database, e.g., a database that can be downloaded using the Internet.

The second, database use mode is particularly useful when the mobile device 10, 18 does not receive a satellite signal from which it can derive its location, e.g., due to weather or lack of coverage. Moreover, the mobile device 10, 18 may be one that is not even provided with the ability to process satellite positioning signals. Yet, the mobile device 10 would still be able to determine its location based on the positioning information/pixel pattern database.

An important aspect of use of the invention relates to drones. As shown in FIG. 3, a drone 18 with an imaging device, such as a camera, and access to a database of pixel patterns and their positional information could be deployed and figure out where it is based solely on images obtained using the imaging device. One or more images would be obtained "in the field" and the drone's processor would analyze the images, determine whether a pixel pattern in any image may be considered a match to one stored in the database, and for those images with such pixel patterns, retrieve the positional information by directing the processor to access the database. The retrieved positional information is analyzed by the processor, upon direction of the computer program, in combination with the angle between the imaging direction and the position of the pixel pattern relative to the center line of the image, and/or the size of the pixel pattern, to determine the location of the drone. By analyzing positional information from multiple pixel patterns via the processor upon execution of the computer program, the location determination of the drone is improved.

In the foregoing, techniques to use images to determine position of a mobile device 10 including an imager are discussed. Generally, these techniques seek to locate a pattern of pixels that has been previously identified and contained in a database 22 of image data obtained by the imaging device of the mobile device or more likely by the imaging device of another imaging device. By extracting information about the position of an imaging device when an image containing the pattern of pixels was taken and/or the appearance of a fixed pattern of pixels in an image taken by the imaging device of the mobile device when at a known position, it is possible to provide a position of the mobile device 10.

Another issue arises when the mobile device 10 moves and it is desired to quantify this movement. The movement quantification may apply after the initial position of the mobile device 10 has been determined by referring to the database 22, or the position of the drone 18 has been determined in a similar manner. Referring to FIG. 6, in step 50, after the position of the mobile device 10 has been provided, the relative movement of the mobile device 10 from its initial position is determined and used to guide or navigate the mobile device 10, or the person holding the mobile device 10 is applicable, to a destination.

More specifically, in one technique, the mobile device 10 obtains images including the same identified pattern of pixels (i.e., a fixed object) and through processing based on differences between the appearance of that pattern in a previously obtained image and in the currently obtained image, can determine the relative movement of the mobile device 10. For example, a monument may appear a fraction of the size in an image taken as the person and the mobile device 10 are walking away from the monument and this size difference can be converted through mathematical processing into an approximation of the movement of the person from the initial determined position. This technique can be used either to determine the relative movement from a known position, and thus the new position, or to confirm or validate a new position derived from a different relative movement determination technique. A map being displayed on a screen of the mobile device 10 may also be updated based on the relative movement of the person and their mobile device 10 from the initial position.

In another embodiment, the mobile device 10 can analyze its relative movement to the initial, known position that has been determined based on image analysis, based on optical techniques that do not require image analysis, this analysis being by a processor upon direction or command of a computer program in the mobile device 10 that resides on non-transitory computer readable medium. As an example of such a technique that does not require image analysis, relative movement of the mobile device 10 can be analyzed using a technique similar to that used by an optical or laser mouse to determine the direction and magnitude of movement. Basically, an optical mouse works based on a change in patterns over a sequence of images. A digital signal processor determines how far the mouse has moved and sends the corresponding coordinates to the computer based on such changes. The same change in pattern analysis can be used by the mobile device 10 to provide an estimation of its relative movement from the initial known position.

Using similar techniques, it possible to guide a pedestrian to a destination by configuring their mobile device 10 to obtain an image in order to determine a known position and then guide them in a path from the known position to the destination based on analysis or determination of relative movement without requiring another image to be obtained and performing position determination based on this another image. Configuration of the mobile device 10 may entail downloading of a computer program that can perform image analysis to determine the initial position and then the subsequent relative movement analysis and then the display of the movement on a screen of the mobile device 10. The computer program may also be configured to provide verbal or audio comments to the person to aid in their guidance to the destination. In this case, the computer program would monitor the distance and direction in which the mobile device 10 is moving and issue corrections or commands to provide for the correct path to the destination.

This guiding technique might be extremely useful for a museum wherein it is possible to guide a person from an entrance to the museum to a series of objects in the museum simply by initially fixing the person's position at the entrance to the museum by accessing the database 22, and then analyzing relative movement from that position. The person is thus guided in a path to the objects using relative movement analysis techniques of their mobile device 10 by means of a processor of the mobile device and a computer program interacting with the processor. The computer program would also interact with the imaging device or other means to enable it to assess the relative movement from the known, initial position. The person could potentially enter the objects they want to see, obtain the position of those objects, and the computer program on the mobile device 10 would configure the necessary relative movement path from the starting point to the objects.

Another use is for a drone 18, e.g., drone navigation inside of a building. The drone 18 would be provided with an imaging device 20 to obtain an image to fix its initial position (see FIG. 3). Then, the drone 18 could be configured to analyze its relative movement from this initial position to conform to a desired path. The drone 18 can thus be guided to a destination from only a single initial position determination using images. Often, a drone 18 has a system like an optical mouse, i.e., a digital signal processor that can analyze changes in patterns over a sequence of images.

In both situations, it is possible to obtain an image during the course of the movement to confirm or validate the relative movement from the initial, known position, and again perform position determination using a pattern of pixels in the obtained image. This new position could then be used as the starting point for another path of movement obtained using relative movement analysis techniques.

The foregoing techniques may be summarized as a navigation technique wherein the first stage is a feature matching stage wherein the absolute position of the mobile device 10 is determined using image analysis, i.e., reference to the database and an attempt to find the closest match for a pattern of pixels contained in an image (consider it the position at time t). The second stage may be considered visual odometry wherein relative movement is analyzed, controlled or directed by a computer program typically resident at the mobile device 10 or drone 18 to direct the movement or correct the movement. This direction or correction may be achieved, when the mobile device is a smartphone or the like with a display and speaker, by the computer program providing oral and/or visual directions to the person holding the mobile device 10, and/or displaying a map of the person's movement relative to the desired movement from the initial known position. The position of the moving mobile device is considered the position at time t+1 second, t+2 seconds, etc.

Visual odometry does not rely on a pre-determined collection of patterns. Instead, it is based on motion of pixels to estimate how the camera (or the device to which the camera is attached or housed within) is moving. There is often a drift that accumulates overtime with the visual odometry. Hence, the resetting of the position using the image feature extraction technique is preferably repeated periodically. It may be repeated whenever an accurate position can be obtained or at set intervals, e.g., every minute Disclosed above is therefore a method for generating a database of pixel patterns with positional information using a mobile device with at least one imaging device in accordance with the invention includes obtaining at least one image using the mobile device including a common pattern of pixels and processing the at least one obtained image based on a size of the pattern of pixels in the image to derive positional information about the pattern of pixels. Each obtained image may also be processed based on angular orientation of the pattern of pixels relative to an imaging direction in which the image was obtained by the mobile device to derive positional information about the pattern of pixels.

When multiple images are obtained, each includes a common, stationary pattern of pixels and they are taken from different positions of the mobile device relative to the pattern of pixels. For example, the mobile device is positioned in each of the positions relative to the pattern of pixels at different times, and an image obtaining actuator on the mobile device is pressed while the mobile device is in each of the different positions. A panoramic camera may be attached to the mobile device and images obtained using the panoramic camera.

Also disclosed above is a method for determining location of a mobile device with at least one imaging device in accordance with the invention includes obtaining at least one image including a stationary pattern of pixels using the mobile device, searching through a database of pixel patterns for the obtained pattern of pixels, retrieving positional information about one of the pattern of pixels that is deemed to be a closest match to the obtained pattern of pixels and analyzing in combination with the retrieved positional information, at least one of an angle between an imaging direction in which the image including the closest match pattern of pixels was obtained by the mobile device and an imaging direction in which the at least one image was obtained, and a size differential between the closest match pattern of pixels and the pattern of pixels in the obtained at least one image to derive positional information about a location of the mobile device. That is, only the size may be analyzed to provide positional information, only the angle may be analyzed to provide positional information or both may be analyzed to provide positional information. The database may be generated as described above or may be generated in a different way to store pixel patterns and associated positional information about the location at which the image was taken.

The derived positional information may be provided to the mobile device in different ways, e.g., visually and/or audibly. For example, the method may entail displaying on a screen of the mobile device, indications of the location of the mobile device and surrounding structure and optionally the position of the pixel pattern used in the location determination.

A navigation method in accordance with the invention disclosed above includes determining an initial position of a mobile device to be guided as according to any of the techniques mentioned above, and then guiding movement of the mobile device, after the initial position of the mobile device is determined, by analyzing using the processor, movement of the mobile device relative to the initial position. This method may be implemented in a system or computer program. Guiding of the movement of the mobile device may entail obtaining multiple images each including a common pattern of pixels and obtained at different times separated by movement of the mobile device and analyzing, using the processor, the images to determine relative movement of the mobile device. This image analysis to determine relative movement may be performed using known algorithms.

Another technique to guide movement of the mobile device entails obtaining multiple images at different times separated by movement of the mobile device and analyzing, using the processor, changes in patterns in the images to determine relative movement of the mobile device.

In one embodiment, the method also involves determining an accurate updated position of the mobile device to be guided as according to any of the techniques described above, after the movement of the mobile device has been guided by analyzing movement of the mobile device relative to the initial position, and then using this updated position, guiding movement of the mobile device, after the updated position of the mobile device is determined, by analyzing using the processor, movement of the mobile device relative to the updated position. Any processor used may be a common processor that performs all of the steps or different, co-located or physically separated processors.

To the extent necessary to qualify the invention as patent-eligible subject matter, the methods in accordance with the invention disclosed above may be considered an improvement to mobile device positioning methods, i.e., "improvements to another technology or technical field". While numerous methods and arrangements are known to determine the position of mobile devices and enable them to be tracked over time, the present invention improves known prior art mobile device positioning methods by improving the determination of the position using stationary objects and a database of positional information about the objects. This database relies on assessment of the appearance of pixel patterns in images relative to known positions of a mobile device that initially imaged the pixel pattern to operatively and later determine position of the same or another mobile device relative to the pixel pattern, and thus the absolute position of the mobile device.

The terms "memory media" and "memory component" are intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in to different, spatially separated computers, one of which executes the programs while connected to the other computer over a network to receive program instructions therefrom for execution.

Non-transitory computer readable media includes, but unless inconsistent with the term is not limited to, any data storage device that can store data which can be thereafter read by a computer system. Examples of the non-transitory computer readable medium include ROM, RAM, CD-ROMs, magnetic tapes, floppy disks, and optical data storage devices. The non-transitory computer readable medium can also be distributed over network coupled computer systems so that the computer readable code is stored in one or more physical locations and executed in a distributed fashion. Also, functional programs, code, and code segments for accomplishing the present disclosure can be easily construed by programmers skilled in the art to which the invention pertains in view of the disclosure herein.

The memory media or component may store a software program or programs operable to implement a method for analyzing images to derive positional information for use in generating a database of such positional information or using such positional information to output position of the mobile device. The memory media may also store a software program or programs operable to implement any of the methods disclosed herein, e.g., a navigation method.

Each computer software program may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. Any of the processor disclosed herein may thus include a central processing unit (CPU) for executing code and data from the memory medium and may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM.

Techniques disclosed in U.S. patent application Ser. No. 11/170,337 filed Jun. 29, 2005, now U.S. Pat. No. 7,397,424, Ser. No. 11/549,703 filed Oct. 16, 2006, now U.S. Pat. No. 7,696,923, Ser. No. 12/167,649 filed Jul. 3, 2008, now U.S. Pat. No. 8,565,788, and Ser. No. 12/172,415 filed Jul. 14, 2008, may be used in combination with the inventions disclosed above. All of these applications are incorporated by reference herein.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A method for providing position-based information to a first mobile device with at least one imaging device, comprising:
    obtaining, using the at least one imaging device of the first mobile device, at least one image including a stationary pattern of pixels;
    receiving, at the first mobile device, from a second mobile device a database containing pixel patterns and positional information about the pixel patterns, the database being generated at the second mobile device by:
        obtaining, using at least one imaging device of the second mobile device, at least one image including a pixel pattern; and
        processing, using a processor of the second mobile device, each of the at least one obtained image based in part on a position of the second mobile device when the at least one image was obtained to derive the positional information about the pixel pattern;
    searching, at the first mobile device, through the database of pixel patterns received from the second mobile device for a pixel pattern that most closely matches the pixel pattern in the obtained at least one image;
    retrieving from the database as a result of the searching, positional information about one of the pixel patterns that is deemed to most closely match the pixel pattern in the obtained at least one image; and
    providing data to the first mobile device dependent on the retrieved positional information about one of the pixel patterns that is deemed to most closely match the pixel pattern in the obtained at least one image.

2. The method of claim 1, further comprising:
    modifying the database of pixel patterns with positional information at the first mobile device by:
        obtaining, using the at least one imaging device of the first mobile device, at least one image including a pixel pattern; and
        processing, using a processor of the first mobile device, each of the at least one obtained image based in part on a position of the first mobile device when the at least one image was obtained to derive positional information about the pixel pattern.

3. The method of claim 1, wherein, after being received from the second mobile device, the database is entirely resident on the first mobile device.

4. The method of claim 1, wherein the step of processing, using the processor of the second mobile device, each of the at least one obtained image based in part on a position of the second mobile device when the at least one image was obtained to derive the positional information about the pixel pattern comprises
    processing, using the processor of the second mobile device, each of the at least one obtained image based in part on a position of the second mobile device when the at least one image was obtained and at least one of a size of the pixel pattern in the image and angular orientation of the pixel pattern relative to an imaging direction in which the image was obtained by the second mobile device to derive the positional information about the pixel pattern.

5. The method of claim 1, wherein the step of obtaining, using the at least one imaging device of the first mobile device, at least one image comprises obtaining the at least one image using a panoramic camera attached to the first mobile device.

6. The method of claim 1, wherein the first mobile device is a pilotless drone.

7. The method of claim 1, wherein the step of providing data to the first mobile device dependent on the retrieved positional information comprises displaying on a screen of the first mobile device, indications of the position of the first mobile device and surrounding structure.

8. The method of claim 1, wherein the step of providing data to the first mobile device dependent on the retrieved positional information comprises displaying on a screen of the first mobile device, indications of the position of the first mobile device and the position of the pixel pattern in the obtained at least one image.

9. The method of claim 1, wherein the step of providing data to the first mobile device dependent on the retrieved positional information comprises displaying on a screen of the first mobile device, indications of the position of the first mobile device and surrounding structure, and the position of the pixel pattern in the obtained at least one image.

10. The method of claim 1, wherein the step of providing data to the first mobile device dependent on the retrieved positional information comprises displaying on a screen of the first mobile device, a map including the position of the first mobile device.

11. The method of claim 1, wherein the step of providing data to the first mobile device dependent on the retrieved positional information comprises providing data configured to visually convey information on a display of the first mobile device.

12. The method of claim 1, wherein the step of providing data to the first mobile device dependent on the retrieved positional information comprises providing data configured to audibly convey information via the first mobile device.

13. A navigation method, comprising:
determining an initial position of the first mobile device to be guided as according to the method of claim 1, and then
guiding movement of the first mobile device, after the initial position of the first mobile device is determined, by analyzing using the processor of the first mobile device, movement of the first mobile device relative to the initial position.

14. The method of claim 13, wherein the step of guiding movement of the first mobile device comprises obtaining multiple images each including a common pixel pattern and obtained at different times separated by movement of the first mobile device and analyzing, using the processor of the first mobile device, the multiple images to determine relative movement of the first mobile device.

15. The method of claim 13, wherein the step of guiding movement of the first mobile device comprises obtaining multiple images at different times separated by movement of the first mobile device and analyzing, using the processor of the first mobile device, changes in patterns in the multiple images to determine relative movement of the first mobile device.

16. The method of claim 13, further comprising:
determining an accurate updated position of the first mobile device to be guided, after the movement of the first mobile device has been guided by analyzing movement of the first mobile device relative to the initial position; and then
using this updated position, guiding movement of the first mobile device, after the updated position of the first mobile device is determined, by analyzing using the processor of the first mobile device, movement of the first mobile device relative to the updated position.

17. The method of claim 13, wherein the first mobile device is a pilotless drone.

18. The method of claim 1, further comprising:
analyzing, using the processor of the first mobile device, in combination with the retrieved positional information, a difference between the most closely matching pixel pattern and the pixel pattern in the obtained at least one image to derive positional information about a position of the first mobile device which is different than the retrieved positional information, and
wherein the step of providing data to the first mobile device dependent on the retrieved positional information about one of the pixel patterns that is deemed to most closely match the pixel pattern in the obtained at least one image comprises providing data to the first mobile device dependent on the derived positional information about the position of the first mobile device.

19. A computer program embodied on non-transitory computer-readable medium and configured to:
generate a database containing pixel patterns and positional information about the pixel patterns by:
directing at least one imaging device of a first mobile device to obtain images each including a pixel pattern; and
directing a processor of the first mobile device to process each obtained image based in part on a position of the first mobile device when the at least one image was obtained to derive the positional information about the pixel pattern;
provide the database to a second mobile device from the first mobile device to enable the second mobile device to obtain position-based information based on analysis of pixel patterns with reference to the database; and
provide position-based information to the first mobile device by
directing the at least one imaging device of the first mobile device to obtain at least one image including a stationary pixel pattern;
directing the processor to search through the database of pixel patterns for a pixel pattern that most closely matches the pixel pattern in the obtained at least one image;
directing the processor to retrieve from the database as a result of the searching, positional information about one of the pixel patterns that is deemed to most closely match the pixel pattern in the obtained at least one image;
obtaining data dependent on the retrieved positional information about one of the pixel patterns that is deemed to most closely match the pixel pattern in the obtained at least one image; and
conveying the obtained data via a data output device of the first mobile device.

20. A method for using a mobile device, comprising:
generating, at the mobile device, a database containing pixel patterns and positional information about the pixel patterns by:
obtaining, using at least one imaging device of the mobile device, at least one image including a pixel pattern; and
processing, using a processor of the mobile device, each of the at least one obtained image based in part on a position of the mobile device when the at least one image was obtained to derive the positional information about the pixel pattern;
providing the database, generated at the mobile device, to another mobile device; and
after the database is generated,
providing position-based information to the mobile device by
obtaining, using the at least one imaging device, at least one image including a stationary pattern;
searching through the database of pixel patterns for a pixel pattern that most closely matches the pixel pattern in the obtained at least one image;
retrieving from the database as a result of the searching, positional information about one of the pixel patterns that is deemed to most closely match the pixel pattern in the obtained at least one image; and providing data to the mobile device dependent on the retrieved positional information about one of the pixel patterns that is deemed to most closely match the pixel pattern in the obtained at least one image.

* * * * *

UNITED STATES PATENT AND TRADEMARK OFFICE
CERTIFICATE OF CORRECTION

PATENT NO. : 10,157,189 B1
APPLICATION NO. : 15/236223
DATED : December 18, 2018
INVENTOR(S) : Cyril Houri It is certified that error appears in the above-identified patent and that said Letters Patent is hereby corrected as shown below:

In the Claims

Claim 20, Column 16, Line 59, after "pattern", insert --of pixels--.

Signed and Sealed this
Twenty-second Day of January, 2019

Andrei Iancu
*Director of the United States Patent and Trademark Office*